United States Patent
Jacobs et al.

(10) Patent No.: US 11,576,408 B2
(45) Date of Patent: Feb. 14, 2023

(54) ICE PROCESSING SYSTEM

(71) Applicants: BSH Home Appliances Corporation, Irvine, CA (US); BSH Hausgeräte GmbH, Munich (DE)

(72) Inventors: Christopher Jacobs, Oak Ridge, TN (US); Wesley Tennyson, Oak Ridge, TN (US)

(73) Assignees: BSH Home Appliances Corporation, Irvine, CA (US); BSH Hausgeräte GmbH, Munich (DE)

( * ) Notice: Subject to any disclaimer, the term of this patent is extended or adjusted under 35 U.S.C. 154(b) by 268 days.

(21) Appl. No.: 16/383,703

(22) Filed: Apr. 15, 2019

(65) Prior Publication Data

US 2020/0323246 A1 Oct. 15, 2020

(51) Int. Cl.
*A23L 3/365* (2006.01)
*F25D 31/00* (2006.01)

(52) U.S. Cl.
CPC ............ *A23L 3/365* (2013.01); *F25D 31/005* (2013.01)

(58) Field of Classification Search
CPC ....... A23L 3/365; F25D 31/005; H05B 6/062; H05B 6/50
USPC ............................................ 219/519; 99/483
See application file for complete search history.

(56) References Cited

U.S. PATENT DOCUMENTS

| | | | |
|---|---|---|---|
| 4,210,795 A * | 7/1980 | Lentz | H05B 6/745 219/709 |
| 4,303,820 A | 12/1981 | Stottmann et al. | |
| 4,524,079 A * | 6/1985 | Hofmann | A23L 3/01 426/241 |
| 5,084,377 A | 1/1992 | Rowan et al. | |
| 5,521,360 A * | 5/1996 | Johnson | H05B 6/686 219/709 |
| 5,690,978 A | 11/1997 | Yin et al. | |
| 5,776,529 A | 7/1998 | Qin et al. | |
| 5,873,254 A * | 2/1999 | Arav | F25D 13/06 62/63 |
| 6,027,075 A * | 2/2000 | Petrenko | B64D 15/00 219/770 |
| 6,138,555 A | 10/2000 | Hata | |

(Continued)

FOREIGN PATENT DOCUMENTS

| | | |
|---|---|---|
| WO | 2006121397 A1 | 11/2006 |
| WO | 2011139144 A1 | 11/2011 |

OTHER PUBLICATIONS

Aneas et al (Year: 2011).*

(Continued)

*Primary Examiner* — Ibrahime A Abraham
*Assistant Examiner* — Frederick F Calvetti
(74) *Attorney, Agent, or Firm* — Michael E. Tschupp; Andre Pallapies; Brandon G. Braun

(57) ABSTRACT

An ice processing system may include a plurality of electrodes configured to create a time-varying electromagnetic field in a cavity, and a controller configured to oscillate a density of the electromagnetic field at a frequency which depends on the temperature of an object in the cavity. The frequency is selected based on a temperature of the object to establish and maintain a resonance condition of dipoles in ice crystals present in the object, such that the electromagnetic field tends to selectively heat ice substantially without heating liquid-phase water.

17 Claims, 7 Drawing Sheets

(56) References Cited

U.S. PATENT DOCUMENTS

| | | | | |
|---|---|---|---|---|
| 6,239,601 B1* | 5/2001 | Weinstein | B64D 15/20 | |
| | | | 73/304 C | |
| 6,250,087 B1 | 6/2001 | Owada et al. | | |
| 6,281,801 B1* | 8/2001 | Cherry | G01N 22/04 | |
| | | | 324/643 | |
| 6,393,975 B2* | 5/2002 | Morshuis | A23L 3/32 | |
| | | | 99/451 | |
| 6,451,364 B1 | 9/2002 | Ito | | |
| 6,684,647 B2* | 2/2004 | Petrenko | B60S 1/026 | |
| | | | 62/276 | |
| 6,733,434 B2* | 5/2004 | Jacobson | A61N 2/02 | |
| | | | 426/237 | |
| 6,847,024 B2* | 1/2005 | Petrenko | B60S 1/026 | |
| | | | 219/770 | |
| 7,087,876 B2* | 8/2006 | Petrenko | B60S 1/026 | |
| | | | 219/770 | |
| 7,227,110 B2 | 6/2007 | Petrenko | | |
| 7,629,558 B2* | 12/2009 | Petrenko | A63C 3/00 | |
| | | | 219/492 | |
| 7,819,003 B2* | 10/2010 | Breed | B60R 21/01546 | |
| | | | 73/290 V | |
| 7,883,609 B2* | 2/2011 | Petrenko | B60S 1/3805 | |
| | | | 204/242 | |
| 7,994,962 B1* | 8/2011 | Ben-Shmuel | H01Q 19/18 | |
| | | | 342/13 | |
| 8,106,539 B2* | 1/2012 | Schatz | H04B 5/0037 | |
| | | | 307/104 | |
| 8,389,916 B2* | 3/2013 | Ben-Shmuel | A23L 3/01 | |
| | | | 219/748 | |
| 8,555,778 B2 | 10/2013 | Ichinose et al. | | |
| 8,653,482 B2* | 2/2014 | Ben-Shmuel | H05B 6/808 | |
| | | | 250/455.11 | |
| 8,759,729 B2* | 6/2014 | Ben-Shmuel | H05B 6/705 | |
| | | | 426/107 | |
| 8,849,441 B2* | 9/2014 | Boyden | A61K 9/08 | |
| | | | 700/117 | |
| 8,899,069 B2 | 12/2014 | Kawamura | | |
| 9,132,408 B2* | 9/2015 | Einziger | H05B 6/72 | |
| 9,167,633 B2* | 10/2015 | Ben-Shmuel | H05B 6/6402 | |
| 9,215,756 B2* | 12/2015 | Bilchinsky | H05B 6/687 | |
| 9,462,635 B2* | 10/2016 | Bilchinsky | H05B 1/02 | |
| 9,565,869 B2 | 2/2017 | Van Oord et al. | | |
| 9,609,692 B2* | 3/2017 | Bilchinsky | H05B 6/688 | |
| 9,609,889 B2 | 4/2017 | Miyashita et al. | | |
| 9,807,823 B2* | 10/2017 | Einziger | H05B 6/6447 | |
| 9,872,345 B2* | 1/2018 | Ben-Shmuel | H05B 6/6455 | |
| 10,080,264 B2* | 9/2018 | Ben-Shmuel | H05B 6/6402 | |
| 10,126,035 B2 | 11/2018 | Cravens et al. | | |
| 10,405,380 B2* | 9/2019 | Bilchinsky | H05B 6/6447 | |
| 10,465,976 B2 | 11/2019 | King | | |
| 10,492,247 B2* | 11/2019 | Ben-Shmuel | H05B 6/6455 | |
| 10,772,165 B2* | 9/2020 | Guatta | H05B 6/745 | |
| 11,057,968 B2* | 7/2021 | Ben-Shmuel | B65D 81/3453 | |
| 2001/0017082 A1* | 8/2001 | Morshuis | A23L 3/32 | |
| | | | 99/451 | |
| 2002/0175163 A1* | 11/2002 | Fagrell | B01J 19/0046 | |
| | | | 219/709 | |
| 2003/0068414 A1 | 4/2003 | Ito | | |
| 2004/0053204 A1* | 3/2004 | Morris | F25D 29/001 | |
| | | | 435/1.1 | |
| 2009/0199577 A1* | 8/2009 | Owada | A23L 3/32 | |
| | | | 62/66 | |
| 2009/0236333 A1* | 9/2009 | Ben-Shmuel | H05B 6/6447 | |
| | | | 219/710 | |
| 2009/0236335 A1* | 9/2009 | Ben-Shmuel | B65D 81/3453 | |
| | | | 219/710 | |
| 2011/0031236 A1* | 2/2011 | Ben-Shmuel | H05B 6/6402 | |
| | | | 235/375 | |
| 2011/0154836 A1* | 6/2011 | Ben-Shmuel | H05B 6/688 | |
| | | | 219/679 | |
| 2012/0103972 A1* | 5/2012 | Okajima | H05B 6/686 | |
| | | | 219/490 | |
| 2012/0153733 A1* | 6/2012 | Schatz | B60L 53/64 | |
| | | | 307/104 | |
| 2012/0308694 A1* | 12/2012 | Price | A23L 3/36 | |
| | | | 426/241 | |
| 2012/0312801 A1* | 12/2012 | Bilchinsky | H05B 6/687 | |
| | | | 219/438 | |
| 2013/0056460 A1* | 3/2013 | Ben-Shmuel | H05B 6/705 | |
| | | | 219/709 | |
| 2013/0119054 A1* | 5/2013 | Ben-Shmuel | H05B 6/72 | |
| | | | 219/748 | |
| 2013/0273222 A1* | 10/2013 | Minvielle | A23B 7/055 | |
| | | | 707/705 | |
| 2015/0147778 A1* | 5/2015 | Pickard | G01N 1/44 | |
| | | | 435/40.5 | |
| 2015/0285552 A1 | 10/2015 | Swaidan et al. | | |
| 2015/0366006 A1* | 12/2015 | Ben-Shmuel | A23L 3/01 | |
| | | | 219/747 | |
| 2016/0108484 A1* | 4/2016 | Preston | C22C 1/002 | |
| | | | 148/538 | |
| 2017/0027026 A1* | 1/2017 | Bilchinsky | H05B 6/6447 | |
| 2017/0055769 A1* | 3/2017 | Grimaldi | H05B 6/62 | |
| 2017/0164431 A1* | 6/2017 | Bilchinsky | H05B 6/6455 | |
| 2017/0336133 A1 | 11/2017 | King | | |
| 2019/0142037 A1* | 5/2019 | Bowden | A23L 3/26 | |
| | | | 422/22 | |
| 2019/0225521 A1* | 7/2019 | Heath | C02F 1/48 | |
| 2019/0274196 A1* | 9/2019 | Guatta | H05B 6/52 | |
| 2019/0364624 A1* | 11/2019 | Bilchinsky | H05B 6/6447 | |
| 2021/0289594 A1* | 9/2021 | Ben-Shmuel | F25D 31/005 | |
| 2021/0381755 A1 | 12/2021 | Mori et al. | | |

OTHER PUBLICATIONS

Xanthakis et al (Year: 2014).*
Part 1 (Year: 2020).*
Part 2 (Year: 2020).*
Aneas et al https://pdf.sciencedirectassets.com/271165/1-s2.0-S0963996911X00121/1-s2.0-S0963996911006491/main.pdf?X-Amz-Security-Token=IQoJb3JpZ2IuX2VjEJT%2F%2F%2F%2F%2F%2F%2F%2F%2F%2FwEaCXVzLWVhc3QtMSJHMEUCIQD76k%2BVAzkvVK3U58gB5pMKgiJV7gW4gUtUfRiRdAASsglgaJNgINTv7%2B4%2BjmDgLv% (Year: 2011).*
Xanthakis et al https://www.sciencedirect.com/science/article/pii/S1466856414000708 (Year: 2014).*

* cited by examiner

ICE PROCESSING SYSTEM

FIELD

This disclosure relates to systems and methods for processing ice, e.g., in frozen products.

INTRODUCTION

Many food products are typically stored and/or transported in a frozen state, e.g., for preservation. However, the presence of frozen liquids such as ice in the food product may have drawbacks. For example, the formation of large ice crystals within the food product may damage the food product's cellular structure. This damage may cause the food product to have an undesirable taste and/or texture when consumed. Additionally, large ice crystals in certain food products, such as ice cream and other emulsions, are typically considered unappealing.

Another drawback relates to thawing the frozen food product (e.g., so that it may be cooked and/or consumed). No known system can selectively heat ice within the food product. In other words, no known system can heat ice within the food product substantially without heating other matter (e.g., liquid-phase water) in the food product. Accordingly, heating frozen food products with known systems tends to at least partially cook portions of the food product while other portions remain frozen. As a result, the food product is cooked unevenly. Better solutions are needed for controlling the formation, presence, and/or melting of ice in food products and/or other suitable objects.

SUMMARY

The present disclosure provides systems, apparatuses, and methods relating to ice processing systems. In some embodiments, an ice processing device includes an enclosure defining a cavity; a temperature sensor configured to measure temperature data corresponding to a temperature within the cavity; a plurality of electrodes configured to create an electromagnetic field within the cavity; and a controller configured to receive the temperature data from the temperature sensor and to oscillate a density of the electromagnetic field at a frequency which depends on the temperature.

In some embodiments, a system for controlling ice crystallization includes a plurality of electrodes configured to generate electromagnetic fields within a cavity; a temperature sensor configured to measure temperature data corresponding to a temperature of an object disposed within the cavity; a state control configured to control electric potential of the electrodes and thereby to cause a density of the electromagnetic field within the cavity to vary at a temperature-dependent frequency in a range of 100 Hz to 100 kHz.

In some embodiments, a temperature controlling system includes an enclosure defining a cavity; means for measuring a temperature of an object disposed in the cavity; means for creating an electromagnetic field within the cavity; and means for varying a density of the electromagnetic field within the cavity at a temperature-dependent frequency corresponding to a dipole resonance condition of ice crystals within the object.

Features, functions, and advantages may be achieved independently in various embodiments of the present disclosure, or may be combined in yet other embodiments, further details of which can be seen with reference to the following description and drawings.

DETAILED DESCRIPTION

Figure 1:
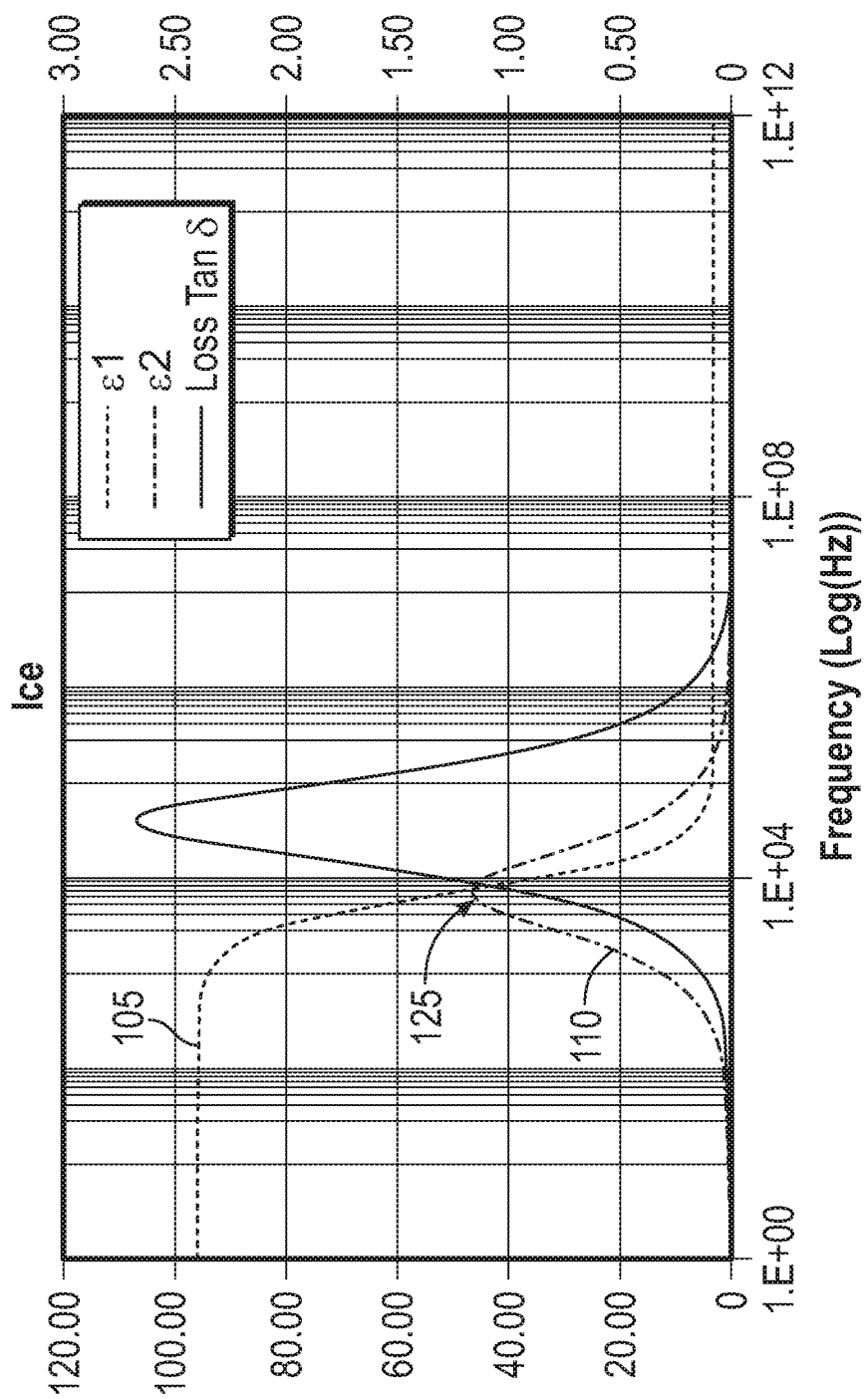
FIG. 1 is a plot depicting frequency-dependent electric permittivity of ice at a temperature of zero degrees Celsius.

Various aspects and examples of an ice processing system configured to vary an electromagnetic field density at a temperature-dependent frequency, as well as related methods, are described below and illustrated in the associated drawings. Unless otherwise specified, an ice processing system in accordance with the present teachings, and/or its various components, may contain at least one of the structures, components, functionalities, and/or variations described, illustrated, and/or incorporated herein. Furthermore, unless specifically excluded, the process steps, structures, components, functionalities, and/or variations described, illustrated, and/or incorporated herein in connection with the present teachings may be included in other similar devices and methods, including being interchangeable between disclosed embodiments. The following description of various examples is merely illustrative in nature and is in no way intended to limit the disclosure, its application, or uses. Additionally, the advantages provided by the examples and embodiments described below are illustrative in nature and not all examples and embodiments provide the same advantages or the same degree of advantages.

This Detailed Description includes the following sections, which follow immediately below: (1) Definitions; (2) Overview; (3) Examples, Components, and Alternatives; (4) Advantages, Features, and Benefits; and (5) Conclusion. The Examples, Components, and Alternatives section is further divided into subsections A through C, each of which is labeled accordingly.

Definitions

The following definitions apply herein, unless otherwise indicated.

"Substantially" means to be more-or-less conforming to the particular dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not intended to show serial or numerical limitation.

"Processing logic" means any suitable device(s) or hardware configured to process data by performing one or more logical and/or arithmetic operations (e.g., executing coded instructions). For example, processing logic may include one or more processors (e.g., central processing units (CPUs) and/or graphics processing units (GPUs)), microprocessors, clusters of processing cores, FPGAs (field-programmable gate arrays), artificial intelligence (AI) accelerators, digital signal processors (DSPs), and/or any other suitable combination of logic hardware.

Overview

In general, an ice processing system in accordance with aspects of the present teachings includes one or more electrodes configured to create a time-varying electromagnetic field in a cavity, and a controller configured to oscillate a field density of the electromagnetic field (e.g., an intensity of the field in Volts per meter or other suitable units) at a frequency which depends on the temperature of an object in the cavity. Typically, the frequency is selected based on a temperature of the object to establish and maintain a resonance condition of dipoles in ice crystals present in the object. Frequencies associated with resonance conditions of dipoles in ice crystals typically differ significantly from frequencies associated with resonance conditions of dipoles in liquid-phase water. Accordingly, an electromagnetic field varied at the ice resonance frequency tends to selectively heat ice, substantially without heating liquid-phase water. The selective heating effect is enabled by dielectric material properties of ice and liquid-phase water, described in the following paragraphs.

The dielectric response of an object to an electromagnetic field may be characterized, in at least some aspects, by the object's permittivity, a generally complex parameter relating to behavior of electric charges within the object in the presence of the applied electromagnetic field. FIG. 1 is a plot depicting the frequency dependence of real permittivity component 105 and imaginary permittivity component 110 of ice at a temperature of zero degrees Celsius (0° C.). As shown in FIG. 1, imaginary permittivity component 110 of ice has a relatively high value or peak 125 corresponding to a particular frequency. This frequency is associated with a resonance of dipoles in the ice, which may include intrinsic dipoles of water, dipoles related to free ions, and/or any other suitable dipoles.

In general, imaginary components of permittivity are associated with absorption of energy by the material from the electromagnetic field. Accordingly, ice absorbs energy more readily from electromagnetic fields oscillating at the dipole resonance frequency corresponding to peak 125, relative to other frequencies. Because absorption of energy by the ice heats the ice, the ice is heated more by electromagnetic fields at the dipole resonance frequency corresponding to peak 125 than at other frequencies.

Figure 3:
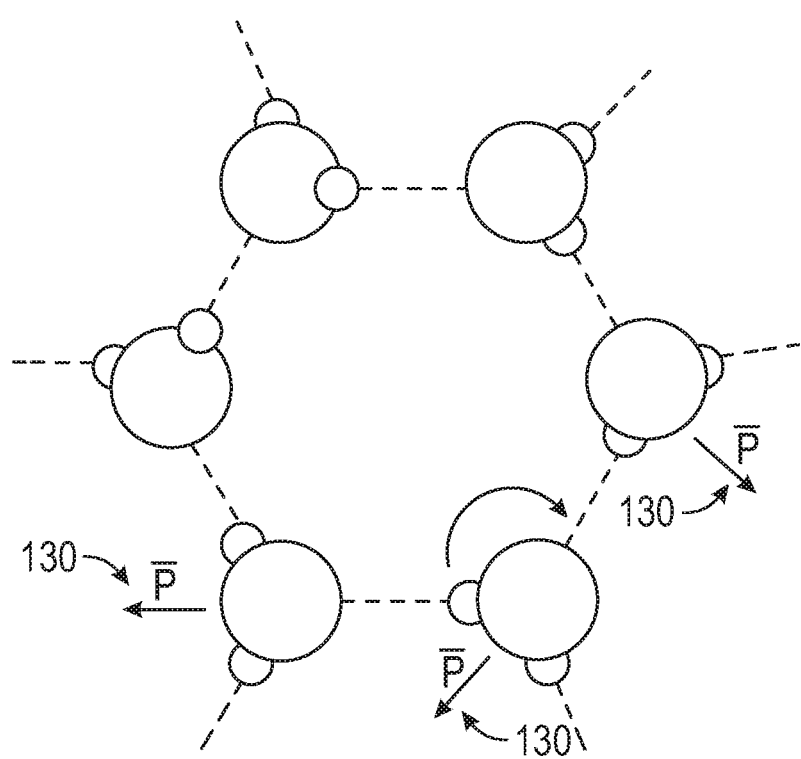
FIG. 3 is a schematic depiction of dipoles within an ice crystalline structure.

The specific frequency or frequencies corresponding to dipole resonance typically depends on the temperature of the ice, which affects the local mobility of ice crystal defects. FIG. 3 depicts dipoles 130 of water molecules (e.g., $H_2O$ molecules) within an illustrative ice crystalline lattice. The response of dipoles 130 to an applied electromagnetic field is typically associated with movement of lattice defects and is therefore temperature-dependent. A hexagonal crystalline lattice is depicted in FIG. 3, but other ice crystalline structures (e.g., cubic lattices) are also possible.

As described above, FIG. 1 illustrates the permittivity of ice at a particular temperature (zero degrees Celsius). At other temperatures, the frequency associated with dipole resonance (e.g., with a high absorption) in ice is typically different from the value shown in FIG. 1. Other features of the frequency dependence of the real and imaginary permittivity components may also differ.

Figure 2:
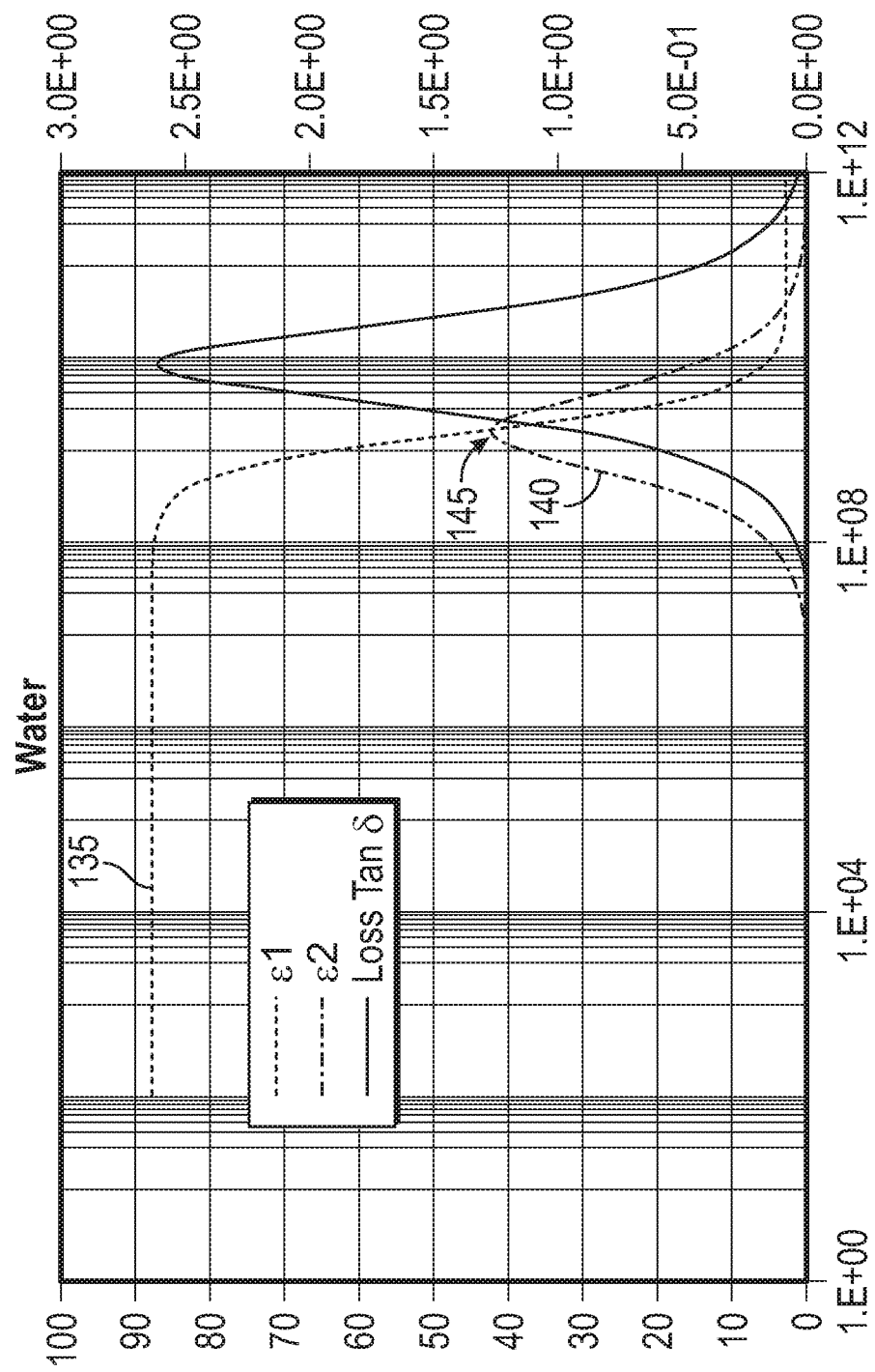
FIG. 2 is a plot depicting frequency-dependent electric permittivity of liquid-phase water at a temperature of zero degrees Celsius.

FIG. 2 depicts real permittivity component 135 and imaginary permittivity component 140 of liquid-phase water at zero degrees Celsius. Imaginary permittivity component 140 of liquid-phase water has a peak 145 associated with a resonance frequency of dipoles in the liquid-phase water. Accordingly, liquid-phase water absorbs energy from (e.g., is heated by) electromagnetic fields oscillating at the resonance frequency associated with peak 145 more readily than from electromagnetic fields oscillating at other frequencies.

As FIGS. 1-2 show, the resonance frequency associated with energy absorption by liquid-phase water (corresponding to peak 145) is far from the resonance frequency associated with energy absorption by ice (corresponding to peak 125). Furthermore, imaginary permittivity component 140 of liquid-phase water is very low at frequencies near ice absorption peak 125. Accordingly, an electromagnetic field oscillating at the resonance frequency of ice (the frequency corresponding to peak 125) typically is absorbed very weakly or not at all by liquid-phase water. An electromagnetic field oscillating at frequencies equal or nearly equal to the resonance frequency of ice therefore tends to heat ice without heating liquid-phase water.

Figure 4:
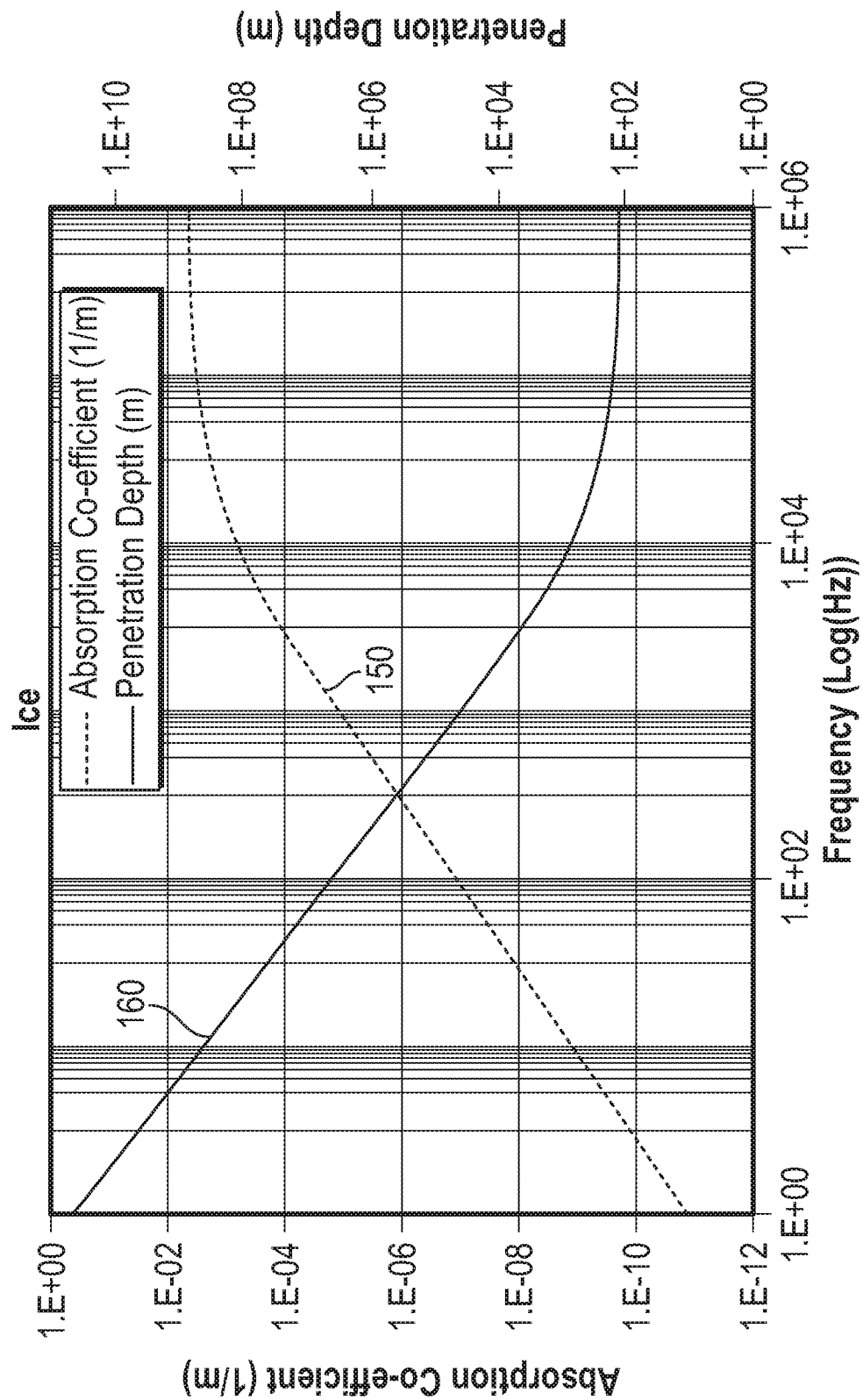
FIG. 4 is a plot depicting frequency-dependent optical penetration and absorption in ice.

FIG. 4 is a plot depicting the frequency dependence of an optical absorption coefficient 150 and an optical penetration depth 160 of ice, according to an illustrative model based on the Beer-Lambert law. As FIG. 4 shows, the predicted optical penetration is deep over a broad range of frequencies. Accordingly, an applied electromagnetic field typically penetrates deeply enough into a volume of ice to selectively heat interior portions of the volume as well as portions near the surface.

Based at least on the principles set forth above, systems and methods of the present disclosure are configured to selectively heat ice by the application of an electromagnetic field (also referred to as a pulsed electric field, or PEF) having a density oscillating at an appropriate temperature-dependent frequency. Selectively heating ice using the systems and methods described herein may inhibit formation of ice crystals, control characteristic ice crystal sizes, melt ice, and/or otherwise process ice, substantially without heating liquid-phase water.

Although systems and methods are described herein in the context of processing food products, they may be used in any suitable context wherein selective heating of ice is desired. For example, systems and methods of the present disclosure may be used to melt ice and/or inhibit the formation of ice on surfaces such as evaporator coils, aircraft wings or other components, streets, driveways, sidewalks, rooftops, or any other suitable surfaces.

Examples, Components, and Alternatives

The following sections describe selected aspects of exemplary ice processing systems, as well as related systems and/or methods. The examples in these sections are intended for illustration and should not be interpreted as limiting the scope of the present disclosure. Each section may include one or more distinct embodiments or examples, and/or contextual or related information, function, and/or structure.

A. Illustrative Ice Processing Device

Figure 5:
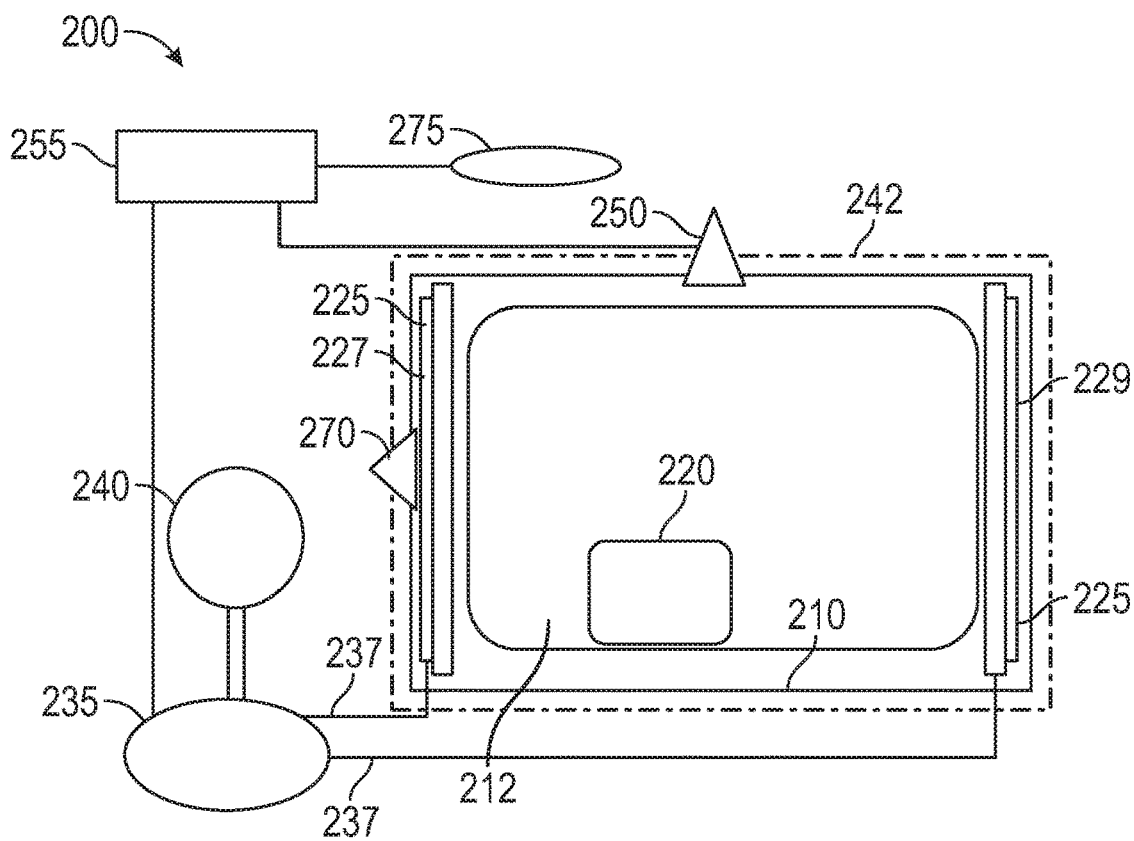
FIG. 5 is a schematic diagram of an illustrative ice processing device, in accordance with aspects of the present teachings.
Figure 6:
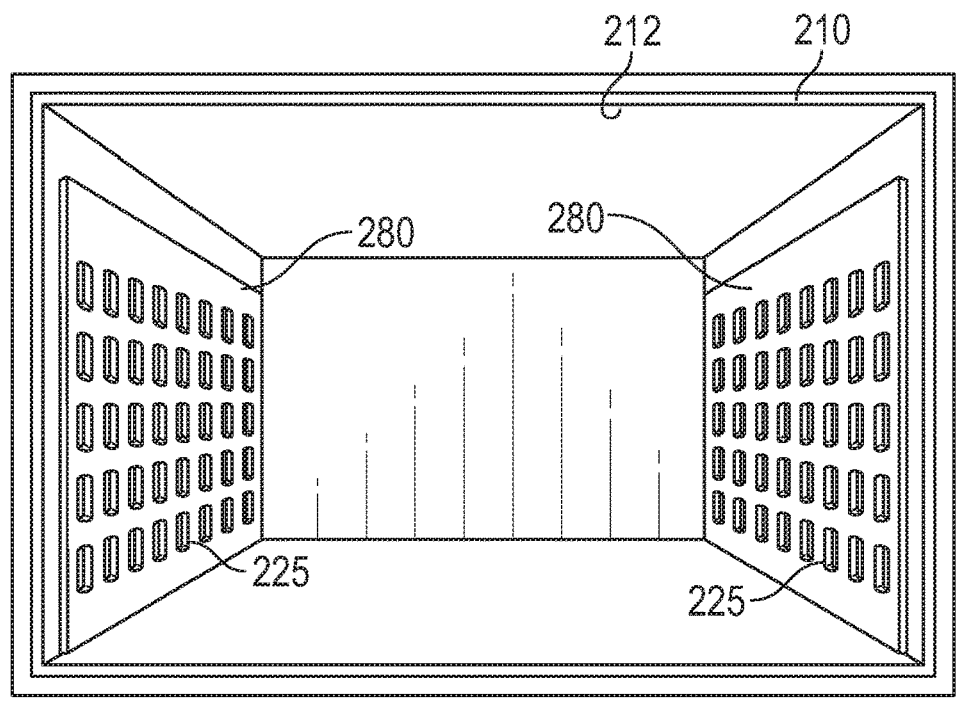
FIG. 6 is a front view of the ice processing device of FIG. 5.

With reference to FIGS. 5-6, this section describes an illustrative ice processing device 200 in accordance with aspects of the present teachings. Ice processing device 200 is an example of an ice processing system configured to selectively heat ice, as described above.

FIG. 5 is a schematic depiction of ice processing device 200. Ice processing device 200 includes an enclosure 210 defining a cavity 212. Enclosure 210 may comprise any suitable size and shape for containing at least one object 220. For example, enclosure 210 may have a rectangular shape, a cylindrical shape, and/or any other suitable shape. Cavity 212 defined by enclosure 210 may have substantially the same shape as the enclosure, or may have a different shape. In some examples, enclosure 210 comprises, or is part of, a conventional freezer, a dedicated freezer compartment, or an adjustable temperature compartment.

Object 220 may comprise any object suitable for processing according to aspects of the present teachings (e.g., to be exposed to an electromagnetic field having an appropriate temperature-dependent frequency). In general, object 220 comprises material that has ice crystals and/or is susceptible to the formation of ice crystals. Typically, object 220 comprises a food product, but in some examples the object may comprise another type of object (e.g., material not intended for consumption). In some examples, object 220 comprises a volume of air or other fluid. Alternatively, or additionally, object 220 may comprise vacuum.

Ice processing device 200 further includes one or more electrodes 225 configured to create a time-varying electromagnetic field within cavity 212. Electrodes 225 may be disposed in any suitable configuration proximate the cavity. In the example depicted in FIG. 5, electrodes 225 comprise a first electrode plate 227 and a second electrode plate 229 disposed on opposing lateral sides of cavity 212. However, other electrode configurations are possible. For example, one electrode may be disposed on a top side of the cavity and one electrode may be disposed on a bottom side of the cavity. As another example, one electrode may be disposed at a central portion of the cavity, and a pair of electrodes may be disposed on opposing sides of the cavity (e.g., top and bottom, or lateral sides). In some examples, the cavity comprises a drawer, and one electrode is disposed above the drawer and another electrode is disposed below the drawer. Some examples include more than two electrodes, and some examples include a single electrode (e.g., an antenna).

In general, electrodes 225 are each designed to produce an electromagnetic field specific to the size and shape of cavity 212. For example, electrodes 225 may be sized and shaped to produce an electromagnetic field that is substantially uniform in space across a predetermined region of cavity 212. With a spatially uniform field, the ability of device 200 to selectively process ice within object 220 is independent of the exact position of the object within cavity 212, which makes the device easier to use.

Electrodes 225 are configured to produce a time-varying electromagnetic field within cavity 212 (e.g., encompassing object 220). For example, electrodes 225 may be connected to a pulse generator 235 (e.g., a high-voltage pulse generator) configured to independently control an electric potential on each electrode (e.g., on first and second electrode plates 227, 229) such that the desired electromagnetic field is created within cavity 212. Pulse generator 235 is connected to electrodes 225 by high-voltage wire(s) 237 and/or any other suitable connection. A power source 240 (e.g., an AC/DC power supply, a DC power supply, and/or any other suitable source) is configured to provide power to pulse generator 235 and/or to any other suitable components of ice processing device 200. Ice processing device 200 may further include a ground plane 242 and/or any other suitable electrical components.

In some examples, electrodes 225 are configured to produce a respective electromagnetic field in each of two or more regions of cavity 212. The frequency and/or amplitude of the field within each region may be independently controllable (e.g., based on temperature data associated with the corresponding region). In this manner, objects having different temperatures, and/or objects having temperatures changing at different rates (e.g., due to different compositions and/or sizes), may be placed in different regions and efficiently processed simultaneously. The electromagnetic fields associated with the different regions may be generated by a common set of electrodes or by different sets of electrodes dedicated to each region.

The temporal variation of the electromagnetic field(s) in cavity 212 may comprise a sinusoidal waveform, a square waveform, a triangular and/or sawtooth waveform, any suitable combination of the foregoing, and/or any other suitable waveform. The waveform may comprise substantially a single frequency, multiple discrete frequencies, a broad frequency band, and/or any other suitable spectrum. For convenience, however, a single frequency is referred to herein.

Ice processing device 200 further includes a temperature sensor 250 configured to measure temperature data corresponding to a temperature of object 220 within cavity 212. Temperature sensor 250 may comprise a thermistor, thermocouple, resistance temperature detector, semiconductor-based sensor, non-contact temperature probe (e.g., an infra-red temperature sensor and/or the like), and/or any other suitable device. Temperature data measured by temperature sensor 250 may correspond to a surface temperature of object 220, an interior temperature of object 220, an average temperature of object 220, and/or any other suitable temperature.

Temperature sensor 250 is coupled to a controller 255 configured to receive the temperature data from the temperature sensor and to oscillate a density of the electromagnetic field at a frequency which depends on the temperature of object 220. As described above, ice most readily absorbs energy from electromagnetic fields having a frequency corresponding to a resonance condition of dipoles within the ice crystals, and that frequency typically depends on the temperature of the ice. Accordingly, controller 255 is configured to vary the density of the electromagnetic field within cavity 212 at a temperature-dependent frequency suitable to establish and maintain a resonance condition of dipoles within ice crystals present within object 220, such that energy from the electromagnetic field is readily absorbable by the ice crystals. The frequency is selected based on temperature data received from the temperature sensor. Any suitable algorithm may be used to determine an appropriate frequency based on the temperature data. Controller 255 may comprise any data processing system and/or processing logic suitable for controlling the electromagnetic field in this manner.

Temperature data may be obtained by temperature sensor 250 and received by controller 255 at any suitable rate, and the frequency of the electromagnetic field may be adjusted at any suitable rate. In some examples, the field frequency is selected based on an initial temperature measurement and is not adjusted based on temperature changes. In other examples, the field frequency is updated at suitable time intervals, which may be predetermined and/or based on measured temperature data (e.g., so that the frequency is updated more often when the temperature is changing rapidly). In yet other examples, the frequency is updated based on the measured temperature data substantially in real time, such that the dipole resonance condition is continuously maintained as the ice is heated.

In some examples, temperature sensor 250 is omitted, and the temperature within the cavity is determined and/or estimated in another way. For example, the time during which a compressor of a refrigeration cycle is active may be measured and used to calculate temperature data.

Controller 255 is typically configured to increase the frequency of the electromagnetic field as the temperature of object 220 increases. In this manner, the electromagnetic field is maintained substantially at resonance with dipoles in any ice crystals present in object 220 as the temperature of the object increases. In some examples, controller 255 increases the frequency of the electromagnetic field with increasing temperature within a range of 100 Hz to 100 kHz. For example, the frequency may be changed within a range of 1 kHz to 10 kHz when the temperature of the object changes within a range of −30 degrees Celsius to 0 degrees Celsius. Within these frequency ranges, the electromagnetic field substantially maintains a resonance with ice crystal dipoles within object 220, such that the ice crystals absorb energy from the field relatively strongly even as the temperature of the object (e.g., of the ice) changes.

Additionally, or alternatively, controller 255 may be configured to adjust a maximum amplitude of the electromagnetic field density based on temperature data received from temperature sensor 250. For example, controller 255 may be configured to cause a maximum amplitude of the electromagnetic field density to change as the temperature sensed by temperature sensor 250 increases or decreases. For example, the maximum amplitude may be decreased as the temperature increases (e.g., as the temperature increases toward 0 degrees Celsius). This may help to avoid overheating. Additionally, or alternatively, decreasing the amplitude as the temperature increases may help to increase the temperature of object 220 at a constant rate, because less energy is required to raise the temperature of the object as the temperature of the object increases. As another example, the maximum amplitude may be increased as the temperature increases (e.g., to maintain a rate of heating as the absorption peak shifts, especially if the field frequency is not also adjusted). As yet another example, the maximum field amplitude may be increased as the temperature is decreased, because more energy is typically required to maintain a supercooling effect. In general, the electromagnetic field intensity may be changed in any suitable manner based on the temperature data, the field frequency, and/or any other suitable parameter.

In some examples, the maximum amplitude of the electromagnetic field density falls within a range of 100 V/m (Volts per meter) to 100,000 V/m, 100 V/m to 10,000 V/m, 1000 V/m to 10,000 V/m, 1000 V/m to 100,000 V/m, and/or any other suitable range.

Controller 255 may be coupled directly or indirectly to one or more of electrodes 225 in any suitable manner enabling the controller to control the frequency (and optionally, amplitude) of the electromagnetic field generated by the electrodes. In the example depicted in FIG. 5, controller 255 is coupled to pulse generator 235, which is in turn coupled to first and second electrode plates 227, 229. In other examples, controller 255 may be coupled directly to one or more electrodes. Alternatively, or additionally, controller 255 may be part of pulse generator 235 (e.g., the pulse generator may be configured to receive temperature data from temperature sensor 250 and to adjust the frequency of the generated electromagnetic field accordingly).

Ice processing device 200 may further include one or more features to increase user safety. As shown in FIG. 5, an access sensor 270 may be provided to detect access to cavity 212 and, in response, to stop production of the electromagnetic field within the cavity (e.g., via controller 255). For example, access sensor 270 may detect that a door of enclosure 210 has opened, that a new object is present within cavity 212, that object 220 and/or another object is positioned too near an electrode 225, and/or any other suitable indication. In response to detection of access by access sensor 270, the electromagnetic field within cavity 212 is turned off (e.g., by discharging electrodes 225, breaking an electrical circuit associated with the electrodes, and/or any other suitable method). For example, controller 255 may be coupled to access sensor 270 and configured to deactivate the field in response to detection of access.

Ice processing device 200 may further include a status indicator 275 configured to indicate that the device is active (e.g., that electrodes 225 are producing an electromagnetic field within cavity 212). For example, status indicator 275 may comprise one or more lights, LEDs, LCDs, audible alerts, and/or any other suitable indicator(s). Status indicator 275 informs users that electrodes 225 are energized and that accessing cavity 212 may lead to electrical shock and/or other hazards.

In order to further reduce risk of electrical accidents, one or more electrode covers may be configured to electrically isolate electrodes 225. For example, the electrode covers may physically obstruct (e.g., block access to) electrodes 225, thereby preventing a user or object from contacting the electrodes. FIG. 6 depicts a pair of illustrative electrode covers 280 disposed in front of first and second electrode plates 227, 229. In this example, electrode covers 280 each comprise a plate of electrically insulating material having a plurality of holes. However, the electrode covers may take other forms. In some examples, the electrode covers each comprise a coating directly applied to the electrode surfaces.

B. Illustrative System for Controlling Ice Crystallization

Figure 7:
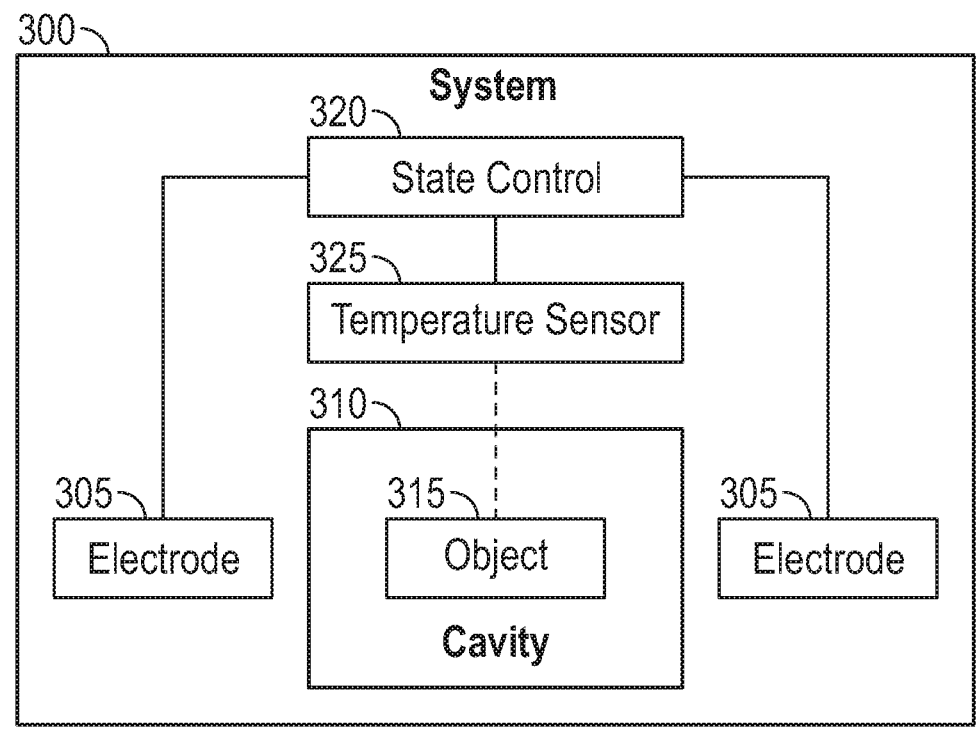
FIG. 7 is a schematic diagram of an illustrative system for controlling ice crystallization, in accordance with aspects of the present teachings.
Figure 8:
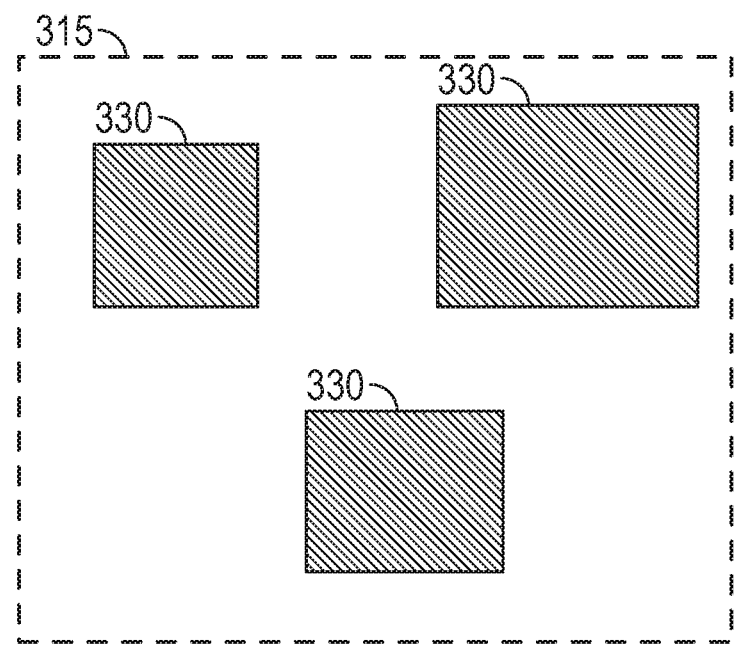
FIG. 8 is a schematic diagram of an object in which large ice crystals are formed.
Figure 9:
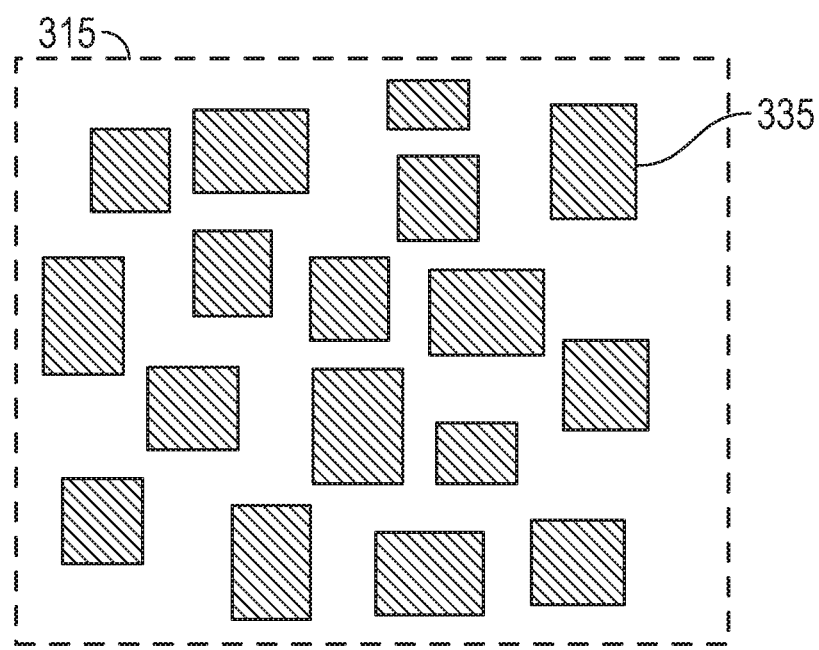
FIG. 9 is a schematic diagram of an object in which smaller ice crystals are formed.

With reference to FIGS. 7-9, this section describes an illustrative system 300 for controlling ice crystallization according to aspects of the present teachings. System 300 is an example of an ice processing system configured to selectively heat ice, as described above. System 300 may be substantially similar to ice processing device 200 in at least some respects.

As shown in FIG. 7, system 300 includes a plurality of electrodes 305. Electrodes 305 are configured to generate electromagnetic fields within a cavity 310. Cavity 310 may be any suitable region of space within which electrodes 305 generate an electromagnetic field. In some examples, cavity 310 is defined by one or more surfaces (e.g., cavity walls), an enclosure, and/or any other suitable structure. Additionally, or alternatively, cavity 310 may be defined by electrodes 305. An object 315 is disposed within cavity 310 to be exposed to the electromagnetic field.

Electrodes 305, which may be similar to electrodes 225 of device 200, may comprise any shape suitable for generating an appropriate electromagnetic field in cavity 310. For example, the plurality of electrodes 305 may include a pair of electrode plates disposed on opposite lateral sides of cavity 310. In other examples, electrodes 305 may be elongate and/or have any other suitable shape(s). The electrodes do not necessarily all have the same shape and/or size. In some examples, only one electrode is included.

System 300 further includes a state control 320 configured to control electric potential of electrodes 305 and thereby to cause a density of the electromagnetic field within cavity 310 to vary at a selected frequency. In some examples, the electric potential of each electrode 305 is independently controllable by state control 320.

As described above, the response of object 315 to an electromagnetic field generally depends on the temperature of the object. Accordingly, the frequency of the electromagnetic field generated within cavity 310 is selected based on the temperature of object 315. System 300 includes a temperature sensor 325 is configured to measure temperature data corresponding to a temperature of object 315. Temperature sensor 325 may be substantially similar to temperature sensor 250 of device 200 in at least some respects. Accordingly, temperature sensor 325 may comprise an infrared sensor, a thermocouple, and/or any other suitable temperature-sensing device(s), and may measure a surface temperature of object 315, an interior temperature of object 315, an average temperature of object 315, and/or any other temperature data suitable for determining an appropriate frequency. Typically, the selected frequency is in the range of 100 Hz to 100 kHz, which encompasses dipole resonance conditions of ice crystals within food products under a suitable range of conditions.

State control 320 may control the electric potential of electrodes 305 to vary generate an electromagnetic field having a temperature-dependent frequency at least partially automatically. For example, state control 320 may be configured to receive temperature data from temperature sensor 325 and to determine an appropriate frequency based on the temperature data according to any suitable algorithm. Alternatively, or additionally, a frequency may be selected manually by a user based on the temperature data.

Typically, state control 320 is configured to vary the electromagnetic field density at a frequency chosen to maintain a resonance condition of ice crystals forming in object 315. Varying the electromagnetic field frequency in a manner that maintains a resonance condition of the ice crystals enables the ice crystals to absorb energy from the field relatively efficiently as the ice temperature changes. In some examples, state control 320 is configured to increase the frequency of the field as a function of increasing temperature of object 315, and to increase or decrease an amplitude of the electromagnetic field density as a function of increasing temperature of the object.

System 300 may be configured to control ice crystallization within object 315. Accordingly, in some examples, the frequency of the electromagnetic field is chosen to inhibit formation of ice crystals in liquid water (e.g., liquid-phase water within object 315) as the temperature of the object decreases below 0 degrees Celsius (e.g., a freezing point of water). For example, the frequency may be selected based on temperature such that the resonance condition is met as ice starts (e.g., nucleation centers) begin to form. Accordingly, the ice starts are heated and tend to be melted before ice crystals can form. Inhibiting formation of ice crystals in liquid-phase water as the temperature of the water decreases below its freezing point may be referred to as supercooling the water.

The ice starts may be heated continuously or non-continuously (e.g., periodically or irregularly) by varying the time during which the electromagnetic field is present in cavity 310.

Additionally, or alternatively, the frequency of the electromagnetic field may be chosen to reduce a characteristic size of ice crystals forming in object 315, as the temperature of the object decreases below a freezing point of the object. As the temperature of the liquid-phase water is reduced below its freezing point (e.g., as the liquid-phase water is supercooled to progressively lower temperatures), the number of ice starts present increases rapidly. The electromagnetic field may tend to heat these ice starts, thereby melting them. However, ice starts having a size below a critical diameter tend to be less susceptible to heating by the electromagnetic field. Accordingly, the electromagnetic field may preferentially remove large ice starts while allowing smaller ice starts to form. In this manner, a characteristic size of ice crystals (e.g., ice crystal domains) is reduced. The concentration of ice starts may increase, but large domains will typically not be formed as long as the concentration is below a percolation threshold. FIGS. 8-9 schematically depict object 315 after the formation of ice crystals of different sizes and concentrations. Specifically, FIG. 8 depicts object 315 having a plurality of large ice crystals 330, and FIG. 9 depicts object 315 having a plurality of smaller ice crystals 335 that are reduced in size relative to crystals 330. The rectilinear shapes of crystals 330 and 335 is purely symbolic—the actual ice crystals may form in a wide variety of crystalline shapes.

Optionally, the electric potential of electrodes 305 may be increased as the temperature of object 315 decreases below a freezing point of the object (e.g., the electromagnetic field amplitude is increased as the temperature decreases below freezing). This tends to maintain liquid-phase water within object 315 in a super-cooled state, inhibiting the formation of ice crystals in the liquid-phase water and leading to a reduced size of any ice crystals that do form within the object.

C. Illustrative Combinations and Additional Examples

This section describes additional aspects and features of ice processing devices and/or systems, presented without limitation as a series of paragraphs, some or all of which may be alphanumerically designated for clarity and efficiency. Each of these paragraphs can be combined with one or more other paragraphs, and/or with disclosure from elsewhere in this application in any suitable manner. Some of the paragraphs below expressly refer to and further limit other paragraphs, providing without limitation examples of some of the suitable combinations.

A0. An ice processing device, comprising an enclosure defining a cavity; a temperature sensor configured to measure temperature data corresponding to a temperature within the cavity; a plurality of electrodes configured to create an electromagnetic field within the cavity; and a controller configured to receive the temperature data from the temperature sensor and to oscillate a density of the electromagnetic field at a frequency which depends on the temperature.

A1. The ice processing device of paragraph A0, wherein the frequency is selected to establish and maintain a resonance condition of dipoles in ice crystals present in the cavity.

A2. The ice processing device of any one of paragraphs A0 through A1, wherein the electromagnetic field density has a temperature-dependent maximum amplitude.

A3. The ice processing device of paragraph A2, wherein the maximum amplitude decreases (and/or increases) with increasing temperature.

A4. The ice processing device of any one of paragraphs A2 through A3, wherein the maximum amplitude falls within a range of 100 V/m (Volts per meter) to 10,000 V/m.

A5. The ice processing device of any one of paragraphs A0 through A4, wherein the frequency increases with increasing temperature within a range of 100 Hz to 100 kHz.

A6. The ice processing device of any one of paragraphs A0 through A5, wherein the frequency changes within a range of 1 kHz to 10 kHz, when the temperature changes within a range of −30 degrees Celsius to 0 degrees Celsius.

B0. A system for controlling ice crystallization, comprising a plurality of electrodes configured to generate electromagnetic fields within a cavity; a temperature sensor configured to measure temperature data corresponding to a temperature of an object disposed within the cavity; and a state control configured to control electric potential of the electrodes and thereby to cause a density of the electromagnetic field within the cavity to vary at a temperature-dependent frequency in a range of 100 Hz to 100 kHz.

B1. The system of paragraph B0, wherein the plurality of electrodes each have an independently controllable electric potential.

B2. The system of any one of paragraphs B0 through B1, wherein the plurality of electrodes includes first and second electrode plates disposed proximate the cavity (e.g., on opposite lateral sides).

B3. The system of any one of paragraphs B0 through B2, wherein the state control is configured to vary the electromagnetic field density at a frequency chosen to maintain a resonance condition of ice crystals forming in the object disposed within the cavity.

B4. The system of paragraph B3, wherein the frequency changes as a function of increasing temperature of the object.

B5. The system of any one of paragraphs B0 through B4, wherein the state control is configured to change an amplitude of the electromagnetic field density as a function of increasing temperature of the object.

B6. The system of paragraph B0, wherein the frequency is chosen to inhibit formation of ice crystals in liquid water, as the temperature of the object decreases below 0 degrees Celsius.

B7. The system of paragraph B0, wherein the frequency is chosen to reduce a characteristic size of ice crystals forming in the object, as the temperature of the object decreases below a freezing point of the object.

C0. A temperature controlling system, comprising an enclosure defining a cavity; means for measuring a temperature of an object disposed in the cavity; means for creating an electromagnetic field within the cavity; and means for varying a density of the electromagnetic field within the cavity at a temperature-dependent frequency corresponding to a dipole resonance condition of ice crystals within the object.

C1. The system of paragraph C0, wherein means for creating the electromagnetic field include a pair of electrode plates disposed proximate the enclosure, wherein an electric potential associated with each electrode plate is independently controllable.

C2. The system of any one of paragraphs C0 through C1, wherein means for measuring the temperature of the object includes a temperature sensor (e.g., an infrared sensor).

C3. The system of any one of paragraphs C0 through C2, wherein means for varying the density of the electromagnetic field within the cavity includes means for varying the frequency within a range of 100 Hz to 100 kHz.

C4. The system of any one of paragraphs C0 through C3, wherein means for varying the density of the electromagnetic field within the cavity includes means for varying an amplitude of the electromagnetic field density within a range of 100 V/m to 10,000 V/m.

D0. A method of inhibiting ice formation on an evaporator coil, the method comprising exposing the evaporator coil to an electromagnetic field having a temperature-dependent frequency corresponding to a dipole resonance condition of ice crystals forming on the evaporator coil.

D1. The method of paragraph D0, wherein the electromagnetic field is generated during a defrost cycle of a refrigeration circuit comprising the evaporator coil.

D2. The method of paragraph D0, wherein the electromagnetic field is generated during a normal refrigeration cycle of a refrigeration circuit comprising the evaporator coil.

D3. A system configured to generate an electrical current in an evaporator coil, wherein the current oscillates at a frequency corresponding to a greater conductivity in ice than in liquid-phase water, thereby inhibiting ice formation on the evaporator coil.

E0. A method of releasing ice from an ice maker, the method comprising exposing ice contacting a surface of the ice maker to an electromagnetic field having a temperature-dependent frequency corresponding to a resonance condition of dipoles within the ice, thereby causing the ice to melt and detach from the surface.

F0. A method of producing snow, the method comprising generating an electromagnetic field having a temperature-dependent frequency within a volume of humid air, thereby cooling the air below the freezing point of water while inhibiting formation of ice within the air; and then removing the electromagnetic field.

G0. A system comprising any feature described herein, either individually or in combination with any other such feature, configured to inhibit formation of ice on selected portions of a surface or volume and to apply liquid water to the entire surface or volume, such that ice is selectively formed on portions of the surface or volume where ice formation is not inhibited. This system may be referred to as an "ice printer."

H0. A method of detecting ice, the method comprising exposing an object to an electromagnetic field; measuring a phase change of the field; and determining, based on the phase change, information associated with the presence of ice within the object. The electromagnetic field may comprise a plurality of pulses having frequencies below, at, or above a resonance frequency of ice. The information determined may comprise a fraction of ice in the object, the presence of ice on a surface of the object, and/or any other suitable data.

I0. A system configured to generate an electrical current in a frozen food product, wherein the current oscillates at a frequency corresponding to a greater conductivity in ice than in liquid-phase water, thereby selectively heating ice within the frozen food product.

Advantages, Features, and Benefits

The different embodiments and examples of the ice processing systems described herein provide several advantages over known solutions for processing ice. For example, illustrative embodiments and examples described herein allow for selectively heating ice (e.g., substantially without heating liquid-phase water).

Additionally, and among other benefits, illustrative embodiments and examples described herein allow for heating ice without direct contact with a heat source.

Additionally, and among other benefits, illustrative embodiments and examples described herein allow for reducing a size of ice crystals forming within an object. In examples wherein the object is a food product, the reduced size of the ice crystals reduces potential adverse effects of the freezing process (e.g., drip loss, cellular damage, and/or the like) on food texture, taste, and nutritional value.

Additionally, and among other benefits, illustrative embodiments and examples described herein allow a frozen food product to be thawed substantially without heating water within the food product, thereby avoiding cooking portions of the food product during the thawing process.

Additionally, and among other benefits, illustrative embodiments and examples described herein allow processing of ice within a food product or other object (e.g., to inhibit crystal formation, promote growth of small crystals, etc.) without adding any additives configured to lower the freezing point of the object.

Additionally, and among other benefits, illustrative embodiments and examples described herein involve application of electromagnetic fields having a frequency near a resonance frequency of ice, which may heat the ice efficiently and/or optimally. In contrast, known systems involving electromagnetic fields typically apply static fields or fields having a frequency far from the resonance frequency of ice. For example, many systems utilize fields oscillating at or near standard power delivery frequencies (e.g., 40 Hz to 60 Hz), well below the ice resonance frequency. Ice absorbs energy much less readily from fields far from resonance than from fields near resonance. Accordingly, known systems heat ice inefficiently compared to the systems and methods disclosed herein.

Additionally, and among other benefits, illustrative embodiments and examples described herein produce high quality frozen food products without use of a blast chiller, thereby avoiding the high cost of purchasing and operating the blast chiller.

No known system or device can perform these functions. However, not all embodiments and examples described herein provide the same advantages or the same degree of advantage.

CONCLUSION

The disclosure set forth above may encompass multiple distinct examples with independent utility. Although each of these has been disclosed in its preferred form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

What is claimed is:

1. A device which inhibits ice crystallization in an object, comprising:
    an enclosure defining a cavity and comprising an adjustable temperature compartment or a freezer compartment of a refrigeration device or a freezer, the cavity configured to hold the object comprised of a material in which ice crystals may form;
    a temperature sensor configured to measure temperature data corresponding to a temperature of the object within the cavity;
    a plurality of non-contact electrodes which do not contact the object;
    a pulse generator configured to independently control an electric potential on each electrode, such that a time-varying pulsed electric field (PEF) is created within the cavity, the pulse generator being connected to the plurality of non-contact electrodes by wires; and
    a controller configured to receive the temperature data from the temperature sensor and to oscillate a field density of the pulsed electric field within the cavity at a frequency which depends on the temperature of the object,
    wherein the density of the pulsed electric field within the cavity has a maximum amplitude that falls within a range of 100 V/m (Volts per meter) to 10,000 V/m, and
    wherein the controller increases the frequency with increasing temperature within a range of 100 Hz to 100 kHz, such that the ice crystals formed in the object absorb energy from the pulsed electric field even as the temperature of the ice crystals in the object changes, to allow the absorbed energy from the pulsed electric field to heat any formed ice crystals in the object, and thereby inhibit formation of the ice crystals in the object.

2. The device of claim 1, wherein the frequency, is selected to establish and maintain a resonance condition of dipoles in the ice crystals present in the cavity.

3. The device of claim 1, wherein the maximum amplitude of the density of the pulsed electric field is temperature dependent.

4. The device of claim 3, wherein the controller decreases the maximum amplitude with increasing temperature.

5. The ice processing device of claim 1, wherein the controller changes the frequency within a range of 1 kHz to 10 kHz, when the temperature changes within a range of −30 degrees Celsius to 0 degrees Celsius.

6. A system for controlling inhibiting ice crystallization in an object, comprising:
    an enclosure defining a cavity and comprising an adjustable temperature compartment or a freezer compartment of a refrigeration device or a freezer, the cavity configured to hold the object comprised of a material in which the ice crystals may form;
    a plurality of non-contact electrodes which do not contact the object disposed within the cavity;
    a temperature sensor configured to measure temperature data corresponding to a temperature of the object disposed within the cavity;
    a pulse generator configured to create a time-varying pulsed electric field (PEF) within the cavity, the pulse generator being connected to the plurality of non-contact electrodes by wires; and
    a state control configured to control electric potential of the plurality of non-contact electrodes and thereby vary a density of the pulsed electric field within the cavity at a frequency dependent on the temperature of the object, in a range of 100 Hz to 100 kHz. the density of the pulsed electric field having a maximum amplitude that falls within a range of 100 V/m (Volts per meter) to 10,000 V/m, such that the ice crystals formed in the object absorb energy from the pulsed electric field even as the temperature of the ice crystals in the object changes, to allow the absorbed energy from the pulsed electric field to heat any formed ice crystals in the object, and thereby inhibit formation of the ice crystals in the object.

7. The system of claim 6, wherein the plurality of non-contact electrodes each have an independently controllable electric potential.

8. The system of claim 7, wherein the plurality of non-contact electrodes includes first and second electrode plates disposed proximate the cavity.

9. The system of claim 6, wherein the state control is configured to vary the density of the pulsed electric field at a frequency chosen to maintain a resonance condition of the ice crystals forming in the object disposed within the cavity.

10. The system of claim 9, wherein the state control changes the frequency as a function of increasing temperature of the object.

11. The system of claim 6, wherein the state control is configured to change an amplitude of the density of the pulsed electric field as a function of increasing temperature of the object.

12. The system of claim 6, wherein the frequency is chosen to inhibit formation of the ice crystals in liquid water, as the temperature of the object decreases below 0 degrees Celsius.

13. The system of claim 6, wherein the frequency is chosen to reduce a characteristic size of the ice crystals forming in the object, as the temperature of the object decreases below a freezing point of the object.

14. A method of inhibiting ice crystallization in an object disposed in a refrigeration device or a freezer, comprising:
providing an enclosure defining a cavity and comprising an adjustable temperature compartment or a freezer compartment of the refrigeration device or the freezer;
providing the object comprised of a material in which ice crystals may form, in the cavity of the enclosure;
measuring temperature data corresponding to a temperature of the object disposed in the cavity using a temperature sensor;
creating a time-varying pulsed electric field (PEF) within the cavity without contacting the object; and
varying a field density of the pulsed electric field within the cavity at a frequency dependent on the temperature of the object, said frequency corresponding to a dipole resonance condition of the ice crystals within the object,
wherein the varying the field density of the pulsed electric field within the cavity includes varying the frequency within a range of 100 Hz to 100 kHz, the density of the pulsed electric field having a maximum amplitude that falls within a range of 100 V/m (Volts per meter) to 10,000 V/m, and
heating the ice crystals formed in the object based on the pulsed electric field, and thus, inhibiting formation of the ice crystals in the object, such that any ice crystals formed in the object absorb energy from the pulsed electric field even as the temperature of the ice crystals in the object changes.

15. An ice processing device, comprising:
an enclosure of a refrigeration device o a freezer, the enclosure defining a cavity configured to hold an object comprised of a material in which ice crystals may form;
a temperature sensor configured to measure temperature data corresponding to a temperature of the object within the cavity;
a plurality of electrodes configured to create an electromagnetic field within the cavity; and
a controller configured to receive the temperature data from the temperature sensor and to oscillate a field density of the electromagnetic field at a frequency which depends on the temperature,
wherein the controller increases the frequency with increasing temperature within a range of 100 Hz to 100 kHz, such that the ice crystals absorb energy from the electromagnetic field even as the temperature of the ice changes, thereby to heat any ice crystals formed in the object based on the pulsed electric field, and inhibit formation of the ice crystals in the object, and
wherein the controller is configured to receive the temperature data from the temperature sensor and to update the frequency of the electromagnetic field at time intervals based on measured temperature data, so that the frequency is updated more often when the temperature correspondingly changes, such that a dipole resonance condition is continuously maintained as the ice is heated.

16. The method of inhibiting ice crystallization of claim 14, wherein by selecting the frequency, a resonance condition of dipoles in ice crystals present in the cavity is established and maintained.

17. The device of claim 1, wherein the freezer compartment is a drawer, and the plurality of electrodes comprises an electrode above the drawer and an electrode below the drawer.

* * * * *